(No Model.)

G. RACE.
Distilling Apparatus.

No. 242,557. Patented June 7, 1881.

WITNESSES
A. B. Robertson
G. S. Perrie.

INVENTOR
George Race
BY T. J. W. Robertson
ATTORNEY

UNITED STATES PATENT OFFICE.

GEORGE RACE, OF NORWICH, NEW YORK.

DISTILLING APPARATUS.

SPECIFICATION forming part of Letters Patent No. 242,557, dated June 7, 1881.

Application filed April 11, 1881. (No model.)

*To all whom it may concern:*

Be it known that I, GEORGE RACE, a citizen of the United States, residing at Norwich, in the county of Chenango and State of New York, have invented certain new and useful Improvements in Distilling Apparatus; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to a distilling apparatus; and it consists in the peculiar construction and arrangement of the parts, as more fully hereinafter described, and then pointed out in the claims.

Figure 1:
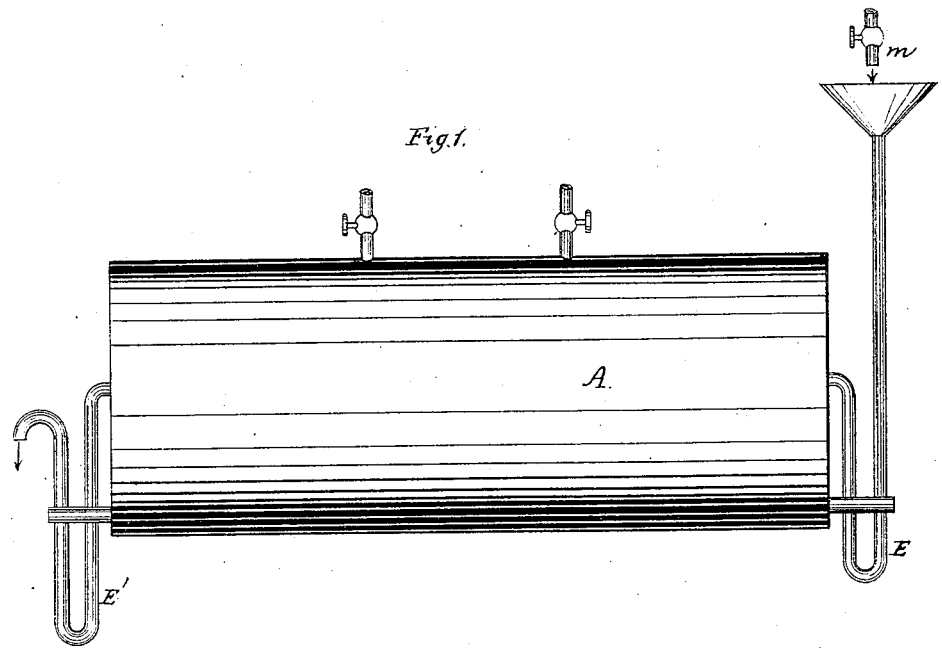
Figure 2:
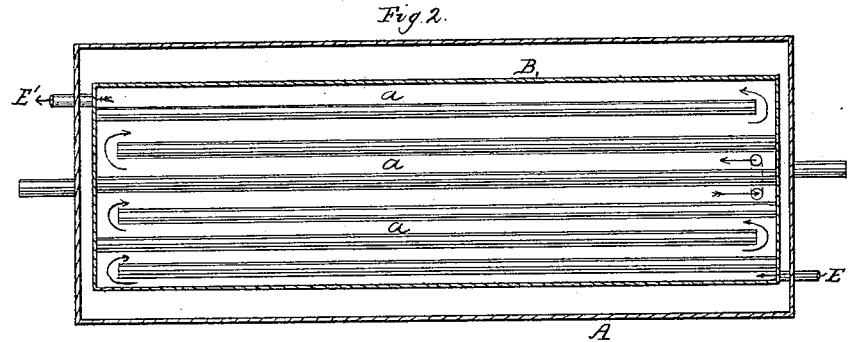
Figure 3:
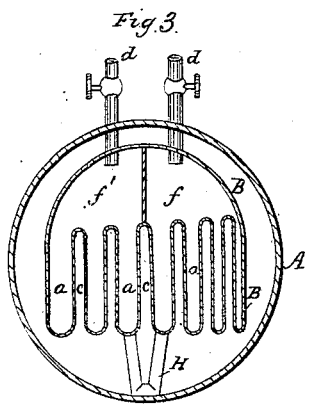

In the drawings, Figure 1 represents a side view of a distilling apparatus; Fig. 2, a horizontal longitudinal section, and Fig. 3 a transverse vertical section.

A represents a cylindrical case of any suitable material, in which sits the evaporator B, having its bottom provided with deep corrugations forming a series of narrow channels of gradually-increasing width and decreasing depth, as shown at $a\ a\ a$, and a series of long cavities, $c\ c\ c$, underneath, to form a large amount of heating-surface. Over these channels is a semi-cylindrical cap, between which and one of the corrugations is a plate dividing the evaporator in two divisions, $f\ f$, each of which is provided with a pipe, $d$, to pass the vapor to the worm, by which arrangement spirits above proof may be taken from one chamber, and those below proof from the other. The two chambers are connected by a bent tube, H, which, being filled with the liquid, prevents the vapor from blowing through from one chamber to the other.

The evaporator is provided with two siphons, E E', to keep the material under pressure, the first of which is provided with a funnel, into which the liquor to be operated on is run from a pipe, $m$, connected with any suitable reservoir, and, after passing through the zigzag channels in the chamber $f$, passes through the bent tube H into the channels in the chamber $f'$, and then exhausts through the siphon E'.

The casing A may be made of either wood or metal if steam is to be used for heating the evaporator, in which case the steam enters and exhausts through the horizontal pipes shown at each end.

It will be observed that the channels through which the liquor runs are very narrow at one side, where the liquor enters, and gradually widen toward the other side, and that the channels gradually decrease in depth as they widen. By this means there is a very thin body of the liquor as it enters, and it is thus very quickly warmed, and the widening of the channels allows of the vapor more readily rising, and the formation of a current from end to end of the zigzag passage is much facilitated.

I do not claim, broadly, the idea of forming zigzag channels in evaporators, as I am aware that such are not new.

What I claim as new is—

1. The evaporator herein described, consisting of a closed chamber, B, provided with a central division, a zigzag channel gradually widening toward its exit, siphons E E', pipes $d\ d$, and a bent tube, H, in combination with the outer chamber, A, provided with steam inlet and outlet pipes, substantially as and for the purpose described.

2. The evaporator herein described, provided with a zigzag channel narrowest at the entrance and widening toward the exit, substantially as and for the purpose specified.

In testimony whereof I affix my signature in presence of two witnesses.

GEORGE RACE.

Witnesses:
  T. J. W. ROBERTSON,
  GEO. F. GRAHAM.